(12) United States Patent
Prinz et al.

(10) Patent No.: US 11,955,646 B2
(45) Date of Patent: Apr. 9, 2024

(54) ULTRATHIN ELECTROCHEMICAL CATALYSTS ON CATALYST SUPPORT FOR PROTON EXCHANGE MEMBRANE FUEL CELLS

(71) Applicants: The Board of Trustees of the Leland Stanford Junior University, Stanford, CA (US); Volkswagen Aktiengesellschaft, Wolfsburg (DE)

(72) Inventors: Friedrich B. Prinz, Stanford, CA (US); Thomas Jaramillo, Stanford, CA (US); Drew C. Higgins, Stanford, CA (US); Yongmin Kim, Stanford, CA (US); Shicheng Xu, Stanford, CA (US); Thomas Schladt, Wolfsburg (DE); Tanja Graf, Wolfsburg (DE)

(73) Assignees: The Board of Trustees of the Leland Stanford Junior University, Stanford, CA (US); Volkswagen Aktiengesellschaft, Wolfsburg (DE)

( * ) Notice: Subject to any disclaimer, the term of this patent is extended or adjusted under 35 U.S.C. 154(b) by 131 days.

(21) Appl. No.: 16/761,740

(22) PCT Filed: Nov. 7, 2018

(86) PCT No.: PCT/US2018/059672
§ 371 (c)(1),
(2) Date: May 5, 2020

(87) PCT Pub. No.: WO2019/094501
PCT Pub. Date: May 16, 2019

(65) Prior Publication Data
US 2020/0343563 A1 Oct. 29, 2020

Related U.S. Application Data

(60) Provisional application No. 62/583,973, filed on Nov. 9, 2017.

(51) Int. Cl.
*H01M 4/92* (2006.01)
*H01M 4/86* (2006.01)
(Continued)

(52) U.S. Cl.
CPC ......... *H01M 4/926* (2013.01); *H01M 4/8657* (2013.01); *H01M 8/1004* (2013.01); *H01M 2008/1095* (2013.01)

(58) Field of Classification Search
CPC .. H01M 4/926; H01M 4/8657; H01M 8/1004; H01M 2008/1095; Y02E 60/50;
(Continued)

(56) References Cited

U.S. PATENT DOCUMENTS 7,833,904 B2 * 11/2010 Tang ..................... H01L 51/102
438/669
10,686,196 B2 * 6/2020 Arihara ................... H01M 4/92
(Continued)

FOREIGN PATENT DOCUMENTS

GB 2 420 219 A 5/2006
JP 2005-122925 5/2005
(Continued)

OTHER PUBLICATIONS

Liang et al., Ultrathin Te Nanowires: An Excellent Platform forControlled Synthesis of Ultrathin Platinum andPalladium Nanowires/Nanotubes with Very HighAspect Ratio, Adv. Mater.2009,21,1850-1854 (Year: 2009).*
(Continued)

*Primary Examiner* — Helen Oi K Conley
(74) *Attorney, Agent, or Firm* — Foley & Lardner LLP

(57) ABSTRACT

A supported catalyst includes: (1) a catalyst support; and (2) deposits of a catalyst covering the catalyst support, wherein
(Continued)

the deposits have an average thickness of about 2 nm or less, and the deposits are spaced apart from one another.

14 Claims, 11 Drawing Sheets

(51) Int. Cl.
*H01M 8/10* (2016.01)
*H01M 8/1004* (2016.01)

(58) Field of Classification Search
CPC .... B01J 35/0033; B01J 35/0013; B01J 35/10; B82Y 30/00
See application file for complete search history.

(56) References Cited

U.S. PATENT DOCUMENTS

| | | | |
|---|---|---|---|
| 2002/0132154 A1 | 9/2002 | Adzic et al. | |
| 2003/0004054 A1 | 1/2003 | Ito et al. | |
| 2006/0196248 A1 | 9/2006 | Nakano et al. | |
| 2007/0003823 A1 | 1/2007 | Mei et al. | |
| 2007/0292339 A1 | 12/2007 | Kubomura et al. | |
| 2010/0047658 A1* | 2/2010 | Colquhoun | H01M 8/0289 |
| | | | 429/465 |
| 2011/0262828 A1 | 10/2011 | Noda et al. | |
| 2015/0280246 A1 | 10/2015 | Kato et al. | |

FOREIGN PATENT DOCUMENTS

| | | | | |
|---|---|---|---|---|
| JP | 2008-269850 A | 11/2008 | | |
| JP | 2012-041581 A | 3/2012 | | |
| JP | 2013-046883 | 3/2013 | | |
| JP | 2014-082077 | 5/2014 | | |
| WO | WO2017/033342 | * 3/2017 | ............. | B01J 23/89 |

OTHER PUBLICATIONS

Sui et al., A comprehensive review of Pt electrocatalysts for the oxygen reduction reaction: Nanostructure, activity, mechanism and carbon support in PEM fuel cells, J. Mater. Chem. A, 2017, 5, 1808 (Year: 2017).*
Hayden et al., The influence of support and particle size on the platinum catalysed oxygen reduction reaction, Phys. Chem. Chem. Phys., 2009, 11, 9141-9148 (Year: 2009).*
International Search Report and Written Opinion issued in PCT Application No. PCT/US2018/059672 dated Jan. 16, 2019, 8 pages.
Qingfeng Liu, "The role of RuO2 nano sheet as a durability enhancing additive to Pt/C fuel cell catalyst reveled with model electrodes," Shinshu University, Doctoral Dissertation, Mar. 2014, pp. 1-49.
Foreign Action other than Search Report on CN 2018800713715 dated Oct. 22, 2021.
Foreign Search Report on EP 18876238.9 dated Jul. 12, 2021.
Zheng, Y. et al., "Uniformly dispersed carbon-supported bimetallic ruthenium-platinum electrocatalysts for the methanol oxidation reaction," J Mater Sci (2017) vol. 52, No. 6, pp. 3457-3466.
Office Action on Japanese Application No. 2020-524468, dated Aug. 18, 2022 (English translation).
CN Office Action on CN Appl. Ser. No. 201880071371.5 dated Nov. 23, 2022 (26 pages).
Foreign Action other than Search Report on JP 2020-524468, dated Mar. 2, 2023.
Foreign Office Action for Chinese Application No. 2018800713715 dated Apr. 19, 2022.
Namiyanghuawu Hecheng Ji Cuihuaxingneng Yanjiu, ISBN 978-7-5369-4208-0, 2007, 4 pages.
Foreign Action other than Search Report on KR dated Aug. 23, 2023.
King et al., "Ultralow Loading Pt Nanocatalysts Prepared by Atomic Layer Deposition on Carbon Aerogels," Nano Letters, vol. 8, No. 8, (2008), pp. 2405-2409.

* cited by examiner

| Structure | Reaction enthalpy (eV) |
|---|---|
| chemisorption on Pt (111) | -2.8 |
| physisorption on Pt (111) | -0.37 |
| physisorption on CO adsorbed Pt (111) | -0.059 |

Figure 5

ULTRATHIN ELECTROCHEMICAL CATALYSTS ON CATALYST SUPPORT FOR PROTON EXCHANGE MEMBRANE FUEL CELLS

CROSS-REFERENCE TO RELATED APPLICATION

This application is a National Stage Entry of PCT/US2018/059672, filed Nov. 7, 2018, which claims the benefit of and priority to U.S. Provisional Application No. 62/583,973, filed Nov. 9, 2017, the contents of which are incorporated herein by reference in their entirety.

BACKGROUND

Proton exchange membrane (PEM) fuel cells have a great potential as power sources for applications such as zero emission vehicles. However, state-of-the-art PEM fuel cells suffer from several drawbacks. One of the most challenging drawbacks is the amount of costly platinum group metals (PGMs), which serve as electrochemical catalysts in a membrane electrode assembly (MEA) of a fuel cell.

It is against this background that a need arose to develop embodiments of this disclosure.

SUMMARY

In some embodiments, a supported catalyst includes: (1) a catalyst support; and (2) deposits of a catalyst covering the catalyst support, wherein the deposits have an average thickness of about 2 nm or less, and the deposits are spaced apart from one another.

In some embodiments, a membrane electrode assembly for a fuel cell includes: (1) a polymeric ion-conductive membrane; and (2) an electrocatalyst layer adjacent to the polymeric ion-conductive membrane, wherein the electrocatalyst layer includes the supported catalyst of the foregoing embodiments.

In some embodiments, a fuel cell includes: (1) a cathode electrocatalyst layer; (2) an anode electrocatalyst layer; and (3) a polymeric ion-conductive membrane disposed between the cathode electrocatalyst layer and the anode electrocatalyst layer, wherein at least one of the cathode electrocatalyst layer or the anode electrocatalyst layer includes the supported catalyst of the foregoing embodiments.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 5. Adsorption energies of platinum (Pt)-containing precursor on Pt and carbon monoxide-adsorbed Pt from density function theory (DFT) calculations.

DETAILED DESCRIPTION

Embodiments of this disclosure are directed to an improved structure of a PGM (or an alloy or other multi-element material including the PGM) deposited on a catalyst support for a highly active, highly stable, and ultra-low loading catalyst for fuel cells, including PEM fuel cells, as well as a process of forming the structure. Through the use of atomic layer deposition, the catalyst can be deposited with reduced thickness and high conformality. The reduced thickness of the catalyst allows efficient use of the catalyst at low loading, and further translates into a higher catalytic activity with greater exposure of catalytic surface atoms. Deposition of the catalyst can yield nano-sized deposits of the catalyst on the support in the form of nanoislands or nanoclusters, and these deposits can be densely packed on a surface of the support and permit the use of the support having a moderate surface area, which is desirable for reducing gas diffusion impedance. Improvement in catalytic activity also can be attained through a proximity effect of the densely packed deposits. Strong adhesion between the deposits of the catalyst and the support provides high stability, rendering greater immunity against degradation processes such as Ostwald ripening and agglomeration.

Figure 1:
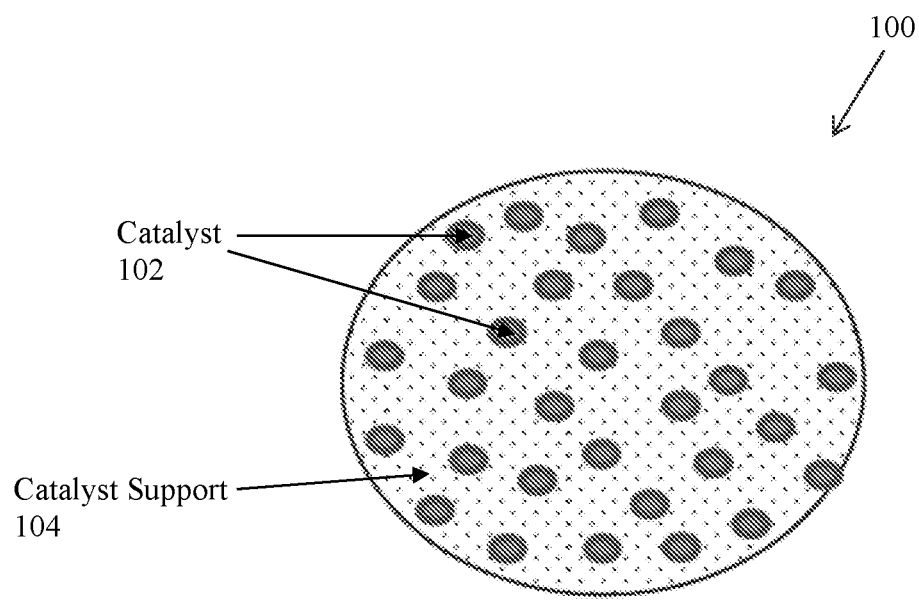
FIG. 1. Schematic illustration of a structure of a supported catalyst, including deposits of a catalyst covering a catalyst support.

FIG. 1 is a schematic illustration of a structure of a supported catalyst 100, including deposits of a catalyst 102 covering a catalyst support 104, according to some embodiments. Although FIG. 1 shows a single instance of the supported catalyst 100, multiple instances of the supported catalyst 100 can be included. Here, the catalyst 102 includes a PGM such as platinum (Pt). In addition to Pt, other PGMs are encompassed by this disclosure, such as ruthenium (Ru), rhodium (Rh), palladium (Pd), osmium (Os), and iridium (Ir), as well as noble metals, such as silver (Ag) and gold (Au). Also encompassed by this disclosure are alloys of two or more different PGMs, as well as alloys of a PGM and a noble metal or other transition metal, such as scandium (Sc), titanium (Ti), vanadium (V), chromium (Cr), manganese (Mn), iron (Fe), cobalt (Co), nickel (Ni), copper (Cu), or zinc (Zn). Referring to FIG. 1, the catalyst support 104 is in the form of a nanoparticle, such as a carbonaceous nanoparticle having a size in a range of about 5 nm to about 500 nm or more, such as from about 10 nm to about 400 nm, from about 10 nm to about 300 nm, from about 10 nm to about 200 nm, from about 10 nm to about 150 nm, or from about 10 nm to about 100 nm, and having an aspect ratio of about 3 or less, or about 2 or less. In the case of a carbonaceous nanoparticle, the nanoparticle can include carbon that is graphitic or amorphous, and multiple instances of such nanoparticles can be provided in the form of a powder. Other types of catalyst supports can be used, such as carbon nanohorns, carbon nanofibers, carbon nanoribbons, graphite, and graphene sheets, as well as non-carbon-based supports. Referring to FIG. 1, the catalyst support 104 is functionalized to promote adhesion with the catalyst 102 that is deposited on the functionalized catalyst support 104.

Figure 2:
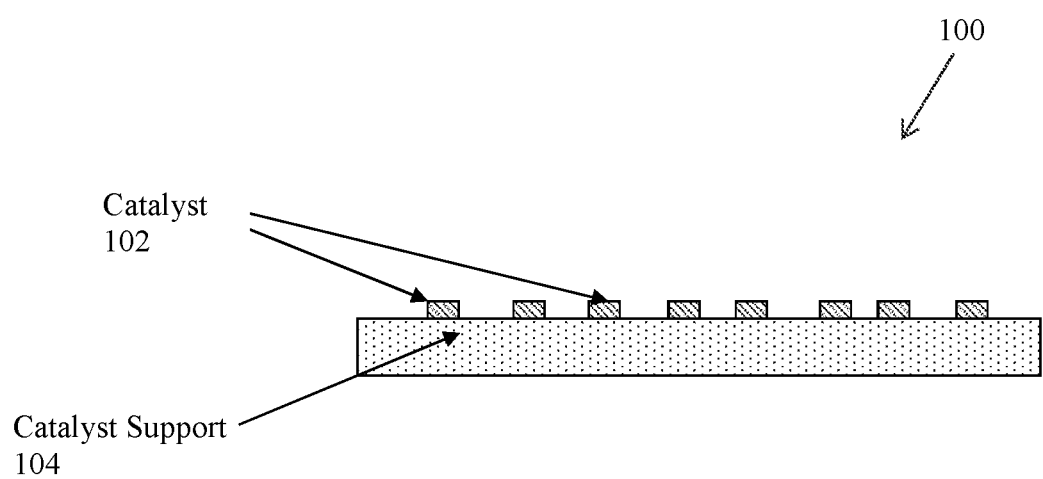
FIG. 2. Schematic illustration of a magnified, cross-sectional view of a portion of the supported catalyst shown in FIG. 1.

FIG. 2 is a schematic illustration of a magnified, cross-sectional view of a portion of the supported catalyst 100 shown in FIG. 1. As shown in FIG. 2, the deposits of the catalyst 102 are in the form of discrete regions of nanoislands or nanoclusters that are spaced apart from one another to expose the underlying support 104, and these deposits provide a surface coverage of the support 104 of at least about 5%, such as at least about 10%, at least about 15%, at least about 20%, at least about 30%, at least about 40%, at least about 50%, at least about 60%, at least about 70%, at least about 80%, at least about 90%, at least about 95%, or at least about 98%, with an average thickness in a range of about 8 nm or less, about 6 nm or less, about 4 nm or less, about 3 nm or less, about 2 nm or less, about 1.9 nm or less, about 1.8 nm or less, about 1.7 nm or less, about 1.6 nm or less, or about 1.5 nm or less, and down to about 1 nm or less, or down to about 0.5 nm or less. For example, the average thickness of the deposits can be in a range of about 1 nm to about 2 nm or about 0.5 nm to about 2 nm. Stated in another way, the average thickness of the deposits can be in a range of about 1 atomic layer to about 20 atomic layers, about 1 atomic layer to about 15 atomic layers, about 1 atomic layer to about 10 atomic layers, about 1 atomic layer to about 8 atomic layers, about 1 atomic layer to about 5 atomic layers, about 1 atomic layer to about 4 atomic layers, about 1 atomic layer to about 3 atomic layers, about 1 atomic layer to about 2 atomic layers, or from about 1 atomic layer to about 1.5 atomic layers. Surface coverage and thicknesses of the deposits can be assessed using imaging techniques, such as using transmission electron microscopy (TEM) or scanning electron microscopy (SEM) images, backscattering spectroscopy, X-ray photoelectron spectroscopy (XPS), or inductively coupled plasma mass spectrometry (ICP-MS). In the case of a single element material, 1 atomic layer can correspond to a thickness of a single layer of atoms of the element. In the case of a binary element material having a molar composition of a % of a first element and b % of a second element, 1 atomic layer can correspond to a thickness of a single layer of atoms having an effective size given by (a/100)×(size of an atom of the first element)+(b/100)×(size of an atom of the second element). A similar weighted average according to a molar composition can be used to specify a thickness of 1 atomic layer for a ternary element material or other multi-element material.

Referring to FIG. 2, the deposits of the catalyst 102 are densely packed on a surface of the support 104, with an average edge-to-edge distance between nearest neighboring deposits of about 20 nm or less, such as about 15 nm or less, about 10 nm or less, about 8 nm or less, about 5 nm or less, about 4 nm or less, or about 3 nm or less, and down to about 0.5 nm or less, or down to about 0.2 nm or less. For example, the average edge-to-edge distance between nearest neighboring deposits can be in a range of about 0.2 nm to about 3 nm. An edge-to-edge distance between two neighboring deposits corresponds to a closest distance between respective edges or boundaries of the deposits, and can be assessed using imaging techniques, such as using TEM or SEM images. The densely packed arrangement of the deposits permits the use of the support 104 having a moderate surface area, such as a Brunauer-Emmett-Teller (BET) surface area of about 500 $m^2/g$ or less, about 400 $m^2/g$ or less, about 300 $m^2/g$ or less, or about 200 $m^2/g$ or less, and down to about 100 $m^2/g$ or less. A loading of the catalyst 102 on the support can be about 20 $\mu g/cm^2$ or less, such as about 18 $\mu g/cm^2$ or less, about 15 $\mu g/cm^2$ or less, about 13 $\mu g/cm^2$ or less, about 10 $\mu g/cm^2$ or less, or about 8 $\mu g/cm^2$ or less, and down to about 7 $\mu g/cm^2$ or less, down to about 5 $\mu g/cm^2$ or less, or down to about 2 $\mu g/cm^2$ or less. An average lateral size of the deposits of the catalyst 102 can be about 20 nm or less, such as about 15 nm or less, about 10 nm or less, about 8 nm or less, about 5 nm or less, about 4 nm or less, or about 3 nm or less, and down to about 1 nm or less. A size of a deposit corresponds to a diameter of a smallest corresponding circle within which the deposit can be fully surrounded, and can be assessed using imaging techniques, such as using TEM or SEM images. The deposits can be flat, rather than spherical or octahedral, with an average aspect ratio (in terms of a ratio of a lateral size to a thickness) of about 1.5 or greater, about 1.8 or greater, about 2 or greater, about 2.5 or greater, about 3 or greater, about 3.5 or greater, about 4 or greater, about 4.5 or greater, about 5 or greater, about 5.5 or greater, or about 6 or greater, and up to about 10 or greater, up to about 15 or greater, or up to about 20 or greater. The flat morphology of the deposits of the catalyst 102 provides a high contact area with the surface of the support 104, per unit mass of the catalyst 102, of at least about $\frac{1}{100}$ $cm^2/\mu g$, at least about $\frac{1}{80}$ $cm^2/\mu g$, at least about $\frac{1}{50}$ $cm^2/\mu g$, at least about $\frac{1}{30}$ $cm^2/\mu g$, or at least about $\frac{1}{10}$ $cm^2/\mu g$, and up to about $\frac{1}{5}$ $cm^2/\mu g$ or greater. The deposits can be characterized by a homogeneous lateral size distribution, with a standard deviation of lateral sizes, relative to an average lateral size, of about 100% or less, about 90% or less, about 80% or less, about 70% or less, about 60% or less, or about 50% or less, and down to about 30% or less.

A process flow of forming a supported catalyst, such as the supported catalyst 100 shown in FIGS. 1 and 2, is next described according to some embodiments. The process flow includes functionalizing a catalyst support to yield a functionalized support, followed by deposition of a catalyst on the functionalized support. Functionalizing the support is performed to introduce anchoring or functional groups to a surface of the support, to enhance or promote chemical bonding with precursors of the catalyst to be deposited on the support. Functionalizing the support can be performed by applying a plasma treatment, such as hydrogen plasma, oxygen plasma, or nitrogen plasma. In place of, or in combination with, a plasma treatment, functionalizing the support can be performed by wet chemical treatment, such as using acids, bases or other reactive compounds, or by thermal treatment. For example, oxidative treatment with oxygen, ozone, nitrogen dioxide, or hydrogen peroxide at elevated temperatures can be performed to introduce functional groups. Also, nitrogen sources or hydrogen sources can be applied to introduce functional groups on the surface of the support.

Next, deposition of the catalyst on the functionalized support is performed by chemical vapor deposition and, in particular, atomic layer deposition. In some embodiments, atomic layer deposition of the catalyst incorporates a passivation treatment to passivate a surface of an already-deposited material of the catalyst to overcome nucleation tendencies that otherwise can lead to the formation of thick islands or clusters. The improved process of some embodiments incorporates the use of a passivation process gas to tune or change a surface energy of an already-deposited material such that deposition will self-terminate, and subsequent deposition of a material will be preferential or promoted towards covering vacant areas of the support instead of the already-deposited material.

The process flow of passivation-incorporated atomic layer deposition includes performing a first atomic layer deposition cycle to deposit the material on the support held within a deposition chamber, followed by performing a second atomic layer deposition cycle to deposit the material on the support, followed by performing a third atomic layer deposition cycle to deposit the material on the support, and so on until a requisite amount of the material is deposited. A number of deposition cycles can be, for example, in a range from 1 to 5000, from 2 to 4000, from 3 to 3000, from 5 to 2000, or from 10 to 1000.

Performing each atomic layer deposition cycle includes sequentially exposing the support, or a portion of the support, to deposition gases including a first precursor containing the material to be deposited, a second oxidative precursor, and a passivation gas. In the case of a single element metal, for example, the first precursor can be a metal-containing precursor such as an organometallic compound with a metal coordinated with organic ligands, and the second oxidative precursor can be oxygen, ozone, or oxygen plasma. For example, for the specific case of Pt, the first precursor can be trimethyl(methylcyclopentadienyl) platinum (IV) or another Pt-containing organometallic compound. In addition to Pt, deposition can be performed for other noble metals, as well as other single element metals, such as Ni or Co. During the first atomic layer deposition cycle, the first precursor is introduced into the chamber to result in the first precursor being adsorbed to the support, in the form of molecules of the first precursor, residues of the molecules of the first precursor, or a combination of both, and the second oxidative precursor is introduced into the chamber to result in a reaction between the adsorbed first precursor and the second oxidative precursor to liberate ligands included in the adsorbed first precursor, thereby leaving the material deposited on the support. A second reductive precursor, such as hydrogen or hydrogen plasma, can be used in place of, or in combination with, the second oxidative precursor. A removal operation can be performed subsequent to introducing each precursor to remove reaction products and any unreacted precursor, such as by evacuation or purging with an inert carrier gas.

The passivation gas is introduced into the chamber subsequent to introducing precursors in each atomic layer deposition cycle, including the first atomic layer deposition cycle, and prior to introducing precursors in a subsequent atomic layer deposition cycle. The passivation gas serves to tune or change an adsorption energy between the first precursor and the already-deposited material to render that adsorption energy less favorable such that subsequent adsorption of the first precursor will be preferential or promoted towards covering vacant areas of the support instead of the already-deposited material. In such manner, the use of the passivation gas enhances dispersion of the first precursor along the support and leads to enhanced and more uniform coverage of deposited material along the support, as well as allowing control over that coverage. In some embodiments, criteria for the passivation gas include one or more of the following: 1) ability to adsorb onto the deposited material; 2) exhibits greater tendency towards or has a stronger adsorption onto the deposited material compared to the support; 3) after adsorption onto the deposited material, the passivation gas forms an intermediate chemical species; and 4) an adsorption energy of the first precursor to the intermediate species is greater than (e.g., less negative or more positive than) about −10 kJ/mol (or greater than about −0.104 eV), such as about −5 kJ/mol or greater (or about −0.052 eV or greater), about 0 kJ/mol or greater (or about 0 eV or greater), or about 10 kJ/mol or greater (or about 0.104 eV or greater), or the adsorption energy of the first precursor to the intermediate species is greater than an adsorption energy of the first precursor to the support. For example, for the case of Pt or another single element metal, the passivation gas can be carbon monoxide (CO). In addition to CO, other passivation gases satisfying the above-noted criteria can be used, such as ammonia ($NH_3$), nitric oxide (NO), and methane ($CH_4$). A process temperature can be controlled to mitigate against desorption of the passivation gas. For example, for the case of CO or another passivation gas, a temperature of the support can be controlled to be in a range from about 50° C. to about 250° C., from about 80° C. to about 200° C., or from about 100° C. to about 150° C.

In addition to use of a passivation gas, passivation-incorporated atomic layer deposition also can be performed using a passivation precursor, which serves dual functions of reacting with a first precursor adsorbed to a support to liberate ligands included in the adsorbed first precursor, and tuning or changing an adsorption energy between the first precursor and an already-deposited material to render that adsorption energy less favorable such that subsequent adsorption of the first precursor will be preferential or promoted towards covering vacant areas of the support. Also, in addition to deposition of a single element material explained above, passivation-incorporated atomic layer deposition also can be applied for deposition of multi-element materials.

Figure 3:
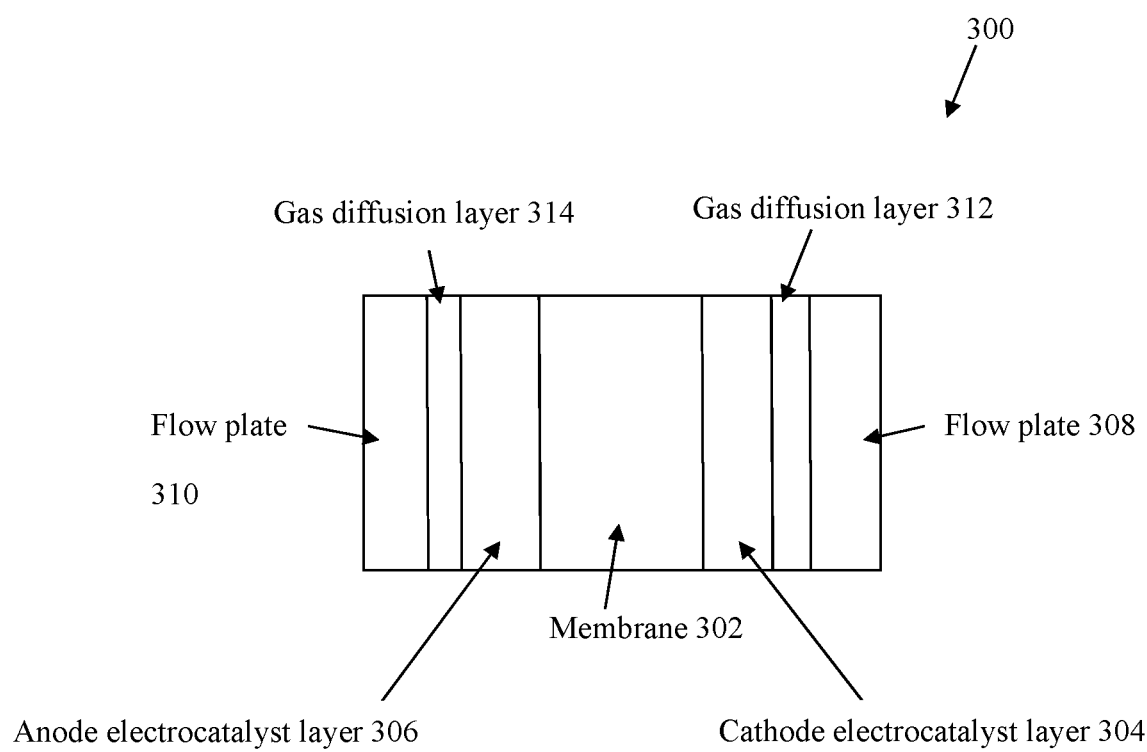
FIG. 3. Schematic illustration of a PEM fuel cell incorporating a supported catalyst disclosed herein.

FIG. 3 is a schematic illustration of a PEM fuel cell 300 incorporating a supported catalyst disclosed herein. The fuel cell 300 includes a polymeric ion-conductive membrane 302 disposed between a cathode electrocatalyst layer 304 and an anode electrocatalyst layer 306, which together constitute a membrane electrode assembly of the fuel cell 300. The fuel cell 300 also includes electrically conductive flow field plates 308 and 310, which can be bipolar plates or unipolar plates. Gas diffusion layers 312 and 314 are also interposed between the flow field plates 308 and 310 and the electrocatalyst layers 304 and 306. Either of, or both, the cathode electrocatalyst layer 304 and anode electrocatalyst layer 306 can include a supported catalyst disclosed herein. For example, the supported catalyst can promote oxygen reduction reaction at the cathode side when incorporated into the cathode electrocatalyst layer 304, and also can promote hydrogen oxidation reaction at the anode side when incorporated into the anode electrocatalyst layer 306.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Figure 4:
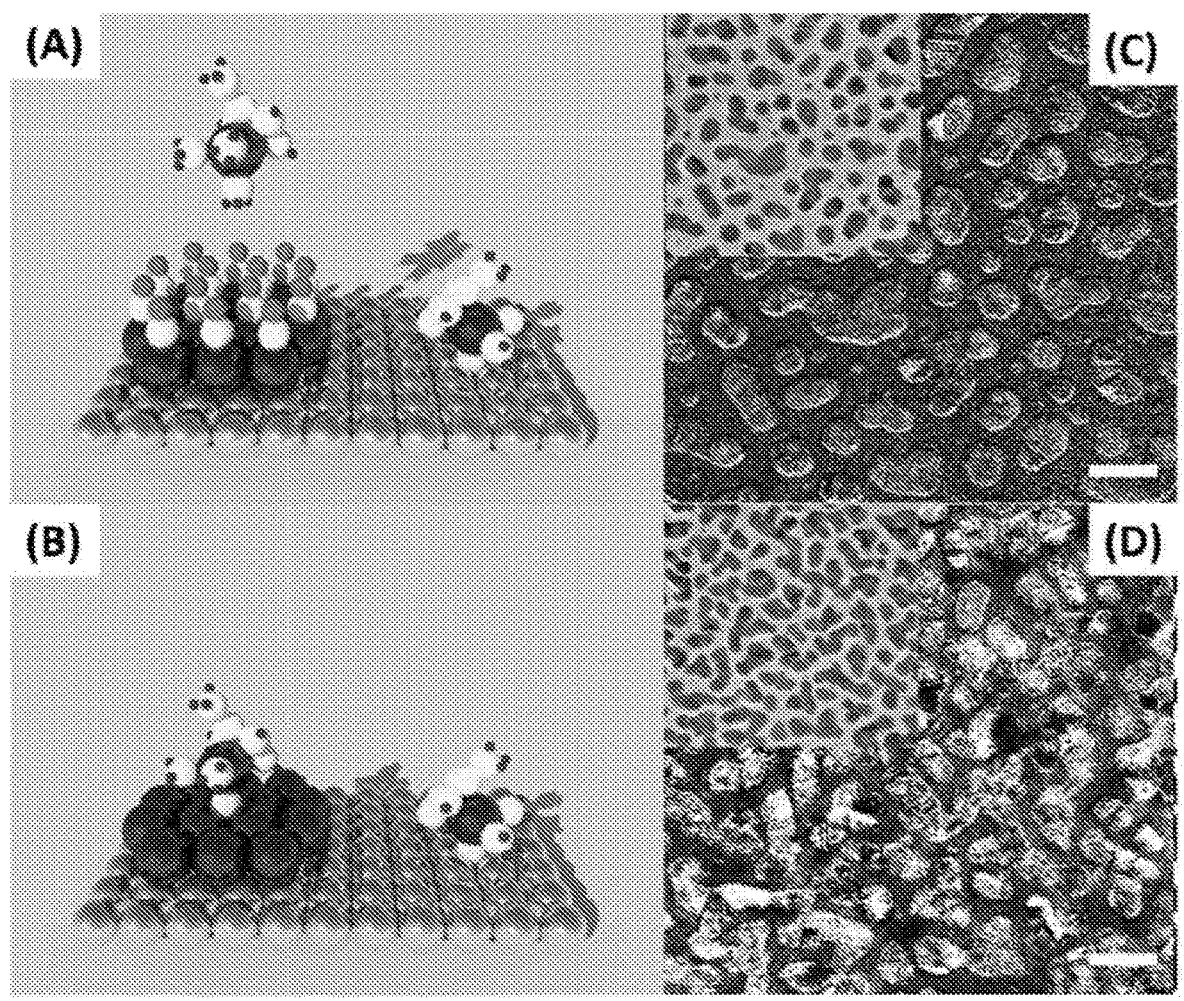
FIG. 4. Schematics of passivation-incorporated atomic layer deposition (PALD) (a) and normal atomic layer deposition (b) processes compared in a precursor adsorption stage. Transmission electron microscopy (TEM) and energy-filtered TEM (EF-TEM) micrographs of 75 cycles of PALD (c) and 50 cycles of normal atomic layer deposition (d) on carbon. Scale bars in (c) and (d) represent 20 nm.

With normal atomic layer deposition (ALD), material growth on a substrate typically undergoes a nucleation phase, where vertical growth and surface coverage compete until the formation of a substantially complete film. This is due to differences in adsorption behaviors of precursors onto a deposited material and the to-be-deposited substrate. As illustrated in FIG. 4b, precursor molecules can adsorb readily on deposits, mostly attributed to van der Waals forces. A strategy to combat nucleation phase and promote precursor coverage on a substrate is to choose the substrate with a higher surface energy so that a surface of the substrate can be effectively wetted. However, this strategy can constrain the choice of substrates. An improved strategy is illustrated in FIG. 4a, where a surface of deposits is modified by adsorbents that passivate the deposit surface to inhibit adsorption of precursors. In this case, carbon monoxide (CO) can be used as a passivation gas for deposition of Pt, as the Pt-containing precursor, trimethyl(methylcyclopentadienyl) platinum (IV), can have significantly less favorable adsorption enthalpy (FIG. 5) on CO-adsorbed Pt compared to on bare Pt. The deposition results on a carbon substrate are showcased in FIGS. 4c and 4d. At similar lateral grain sizes, the passivation-incorporated ALD (PALD) process significantly suppressed vertical growth as compared to formation of three-dimensional islands without the CO passivation. The overall growth rate is also lowered with the introduction of passivation gas, indicating the Pt deposition is mostly dominated by lateral growth of Pt islands with PALD.

Figure 6A:
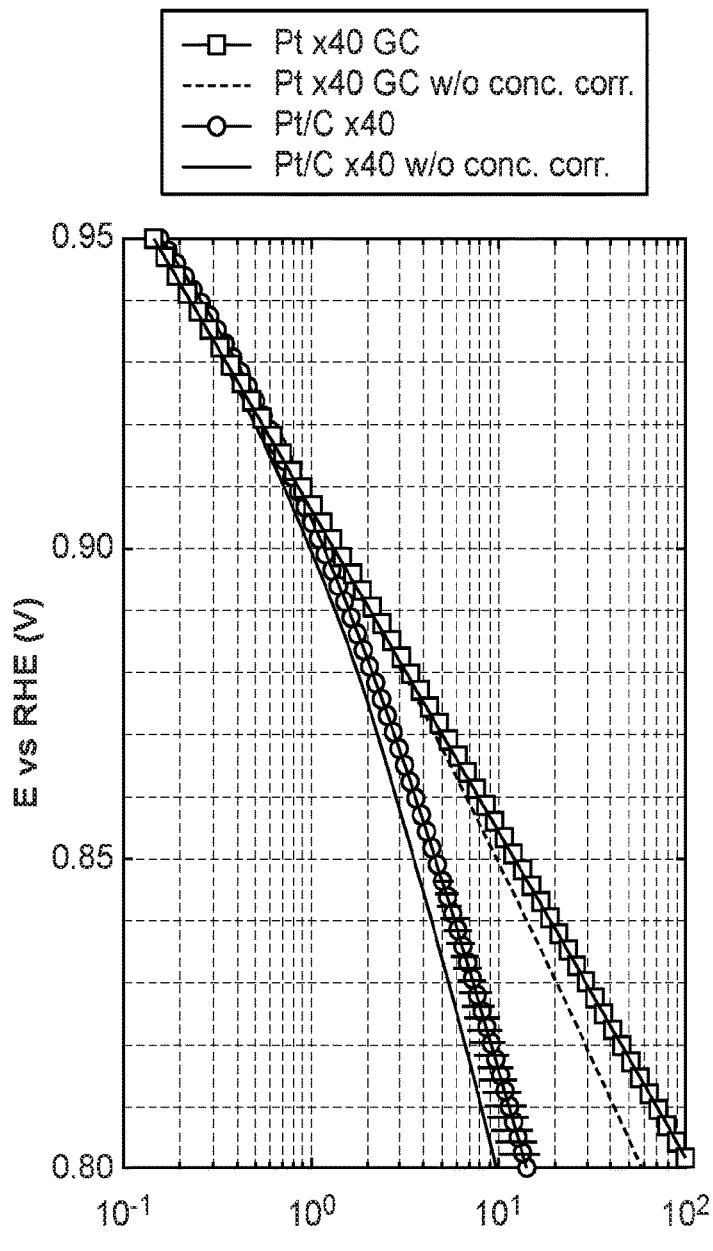
FIG. 6. Glassy carbon electrode and carbon powder decorated by 40 cycles of PALD compared by mass activity vs. electrochemical potential (a). Oxygen reduction reaction (ORR) polarization curves (b) of platinum on carbon (Pt/C) with 40 cycles of PALD before and after 10,000 cycles (about 0.6 to about 1.0 V vs. reversible hydrogen electrode (RHE)) of accelerated degradation test (ADT) in $O_2$ saturated electrolyte. Pt deposit morphology (c) examined by TEM after ADT.
Figure 8A:
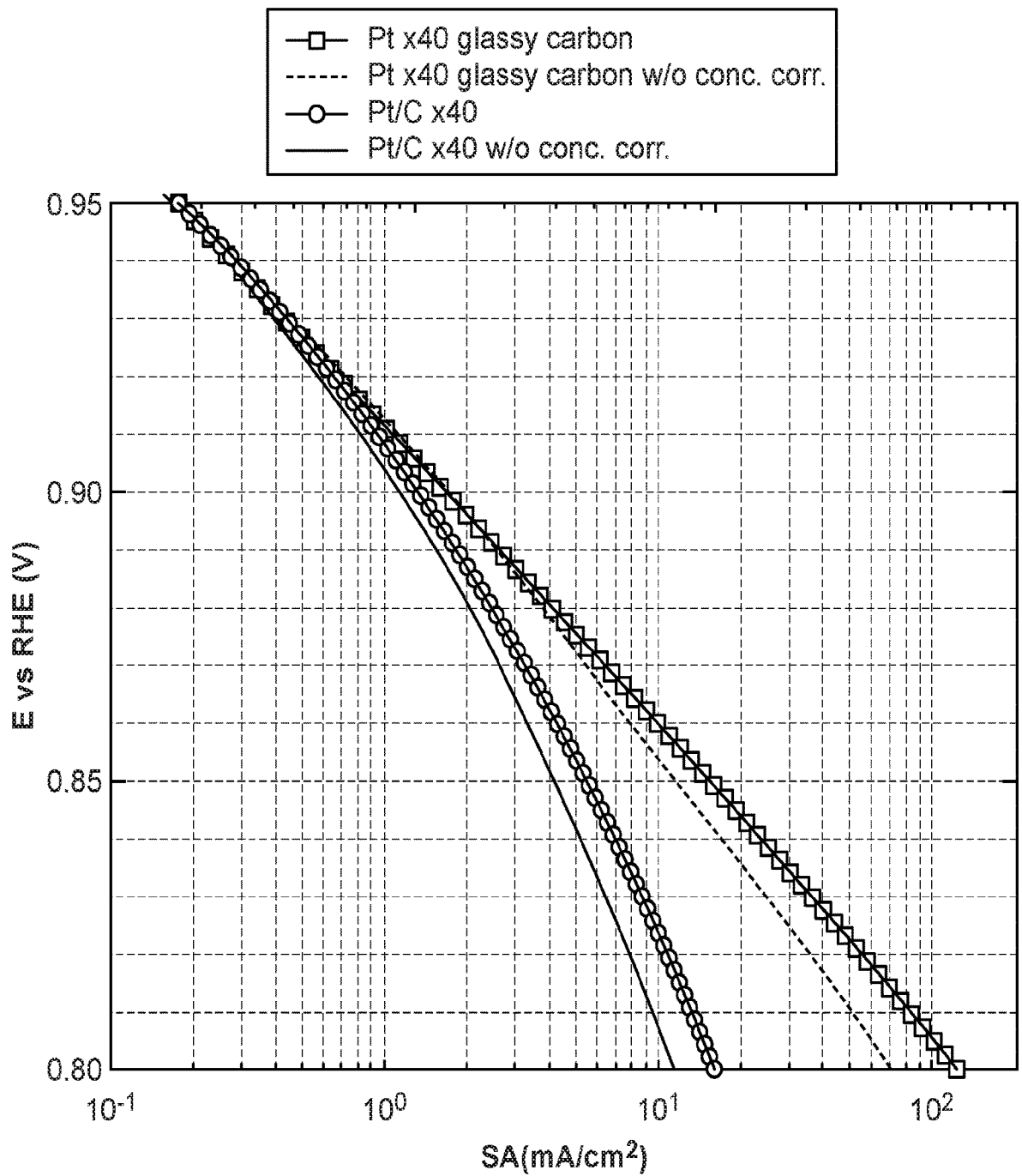
FIG. 8A. Comparison of specific activities of 40 cycles of PALD for Pt on glassy carbon electrode and Pt/C catalysts.
Figure 8B:
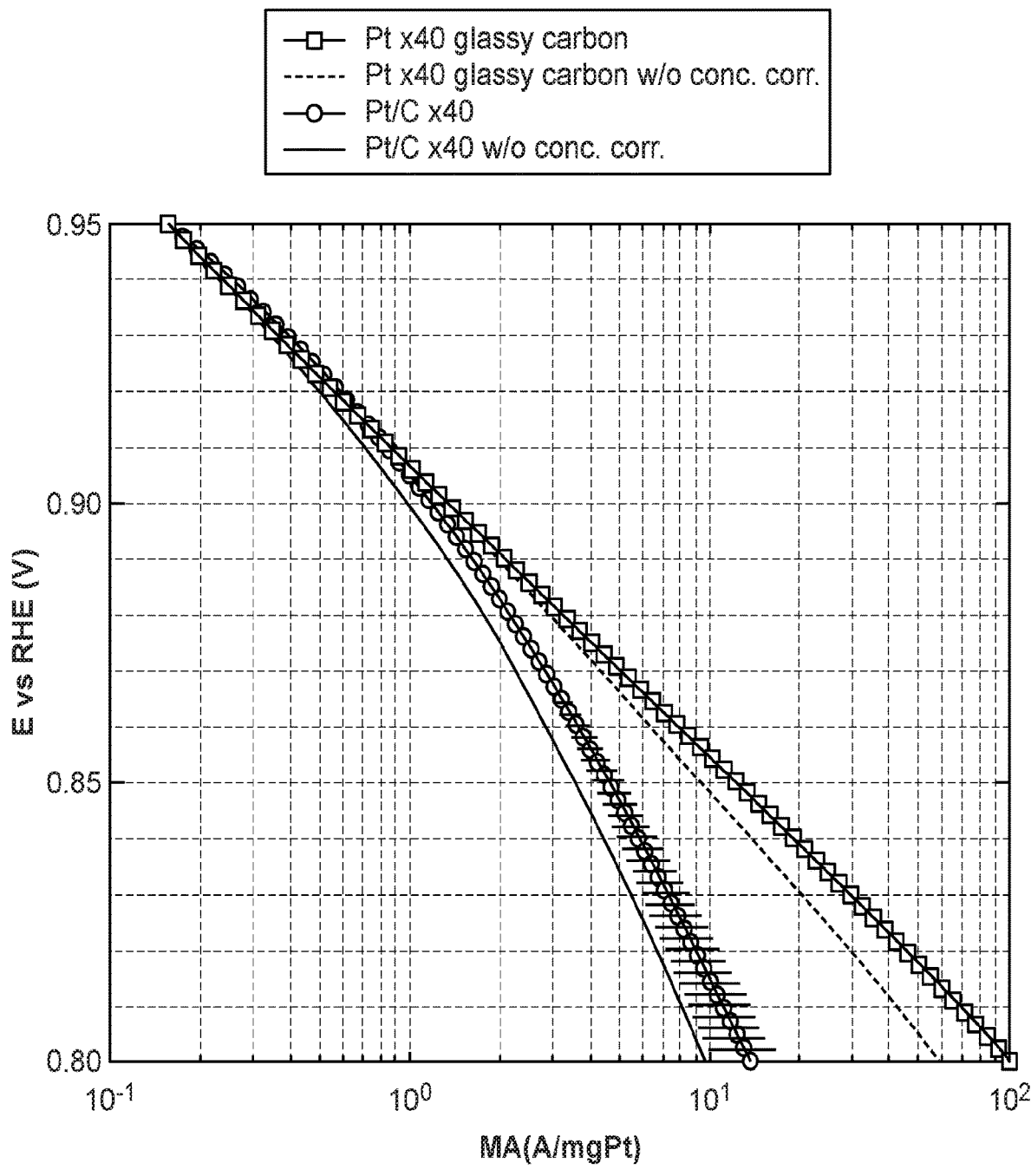
FIG. 8B. Comparison of mass activities of 40 cycles of PALD for Pt on glassy carbon electrode and Pt/C catalysts.
Figure 9:
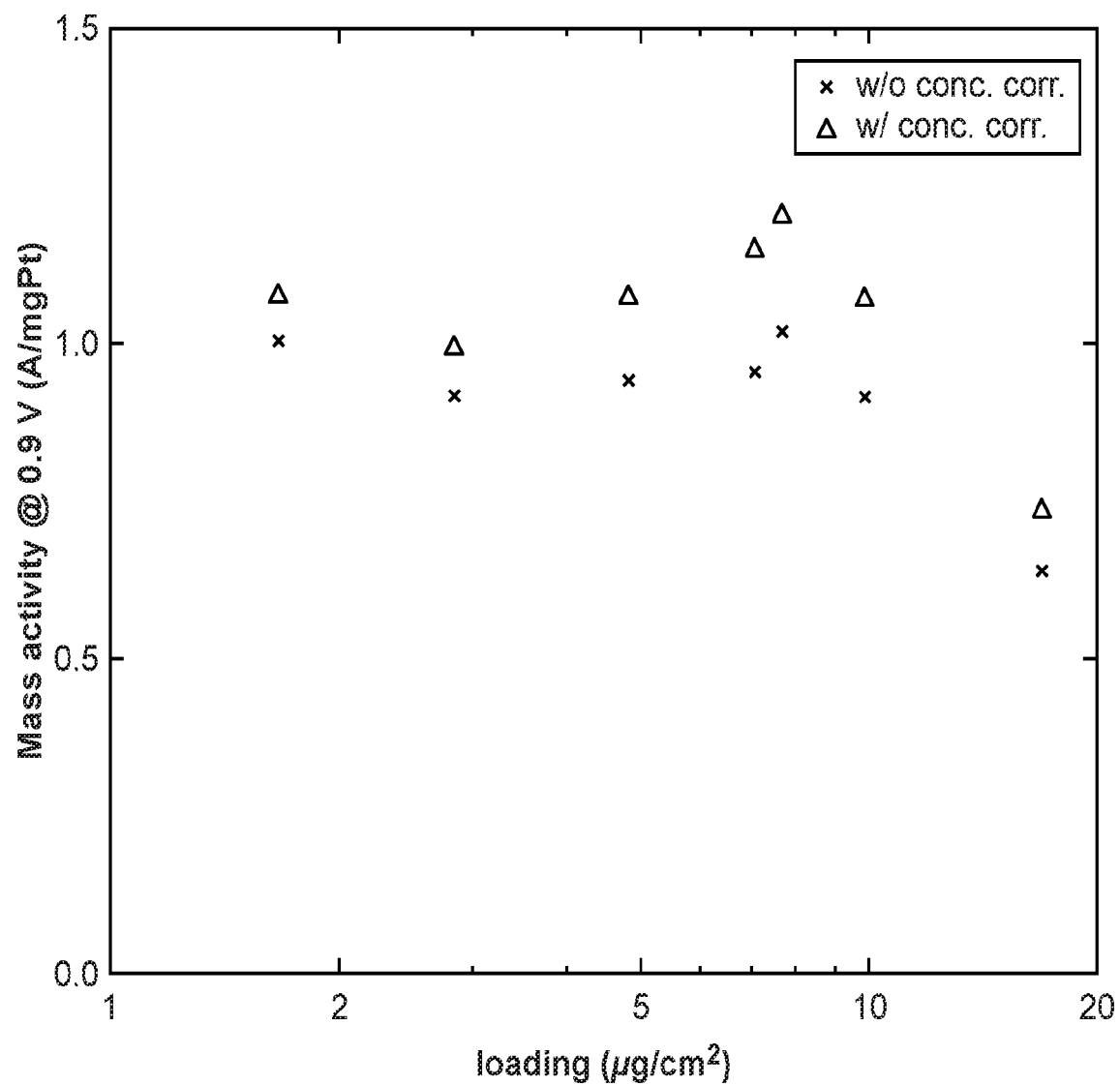
FIG. 9. Mass activity as a function of Pt loading with 40 cycles of PALD Pt/C catalysts.

To demonstrate the feasibility of making practical platinum on carbon (Pt/C) catalyst, PALD was performed on commercially available carbon powders, which then underwent a typical ink formulation process and loaded onto glassy carbon electrodes. A sulfonated tetrafluoroethylene (Nafion) is used as an ionomer binder to ensure the mechanical stability of a thin film of Pt/C catalyst under a rotating disk electrode (RDE) evaluation process. Therefore, the ionomer/carbon ratio was optimized to about 0.1 so that a balance is made between the mechanical stability of the Pt/C thin film and catalytic activity due to additional oxygen diffusion impedance associated with ionomers. Average mass activities of the Pt/C catalysts deposited on carbon powder and Pt deposited directly on glassy carbon are compared in FIG. 6a, and average specific activities of the Pt/C catalysts deposited on carbon powder and Pt deposited directly on glassy carbon are compared in FIG. 8A. Concentration corrections are performed to exclude the underestimation on the performance of Pt/C catalysts due to higher loading than the glassy carbon counterpart (about 7 $\mu g/cm^2$ vs. about 1 $\mu g/cm^2$). As shown by the gaps between dataset with and without concentration correction, the intrinsic kinetic current density of the higher loading catalyst is more underestimated as a result of higher Nernstian loss given a lower surface reactant concentration due to an overall higher performance at a given measured electrochemical potential. Also, mass transport impedance can play a significant role on Pt/C samples as a result of nanostructuring and Nafion, as shown by the gap discrepancy between the Pt/C and Pt/glassy carbon samples below about 0.9 V (vs. reversible hydrogen electrode (RHE)). At this region, the effect of film quality has a larger impact on catalyst performance as indicated by the widening variations among Pt/C samples. The Tafel plot almost overlapped at electrochemical potentials above about 0.92 V (vs. RHE) where the current density is mostly kinetically dominated. The mass activity of Pt/C catalyst at about 0.9 V (vs. RHE) is about 1.16 A/mgPt (about 0.98 A/$mg_{Pt}$ without concentration correction), which significantly outperforms other Pt/C catalysts by more than one fold. Mass activity as a function of Pt loading in the Pt/C catalyst is presented in FIG. 8B and FIG. 9.

Figure 6B:
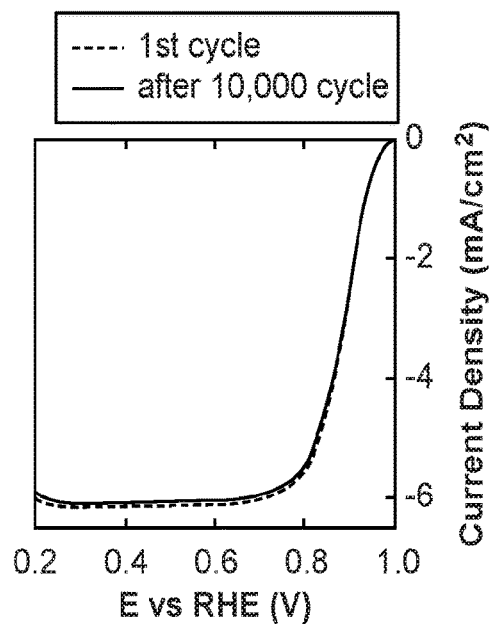
Figure 6C:
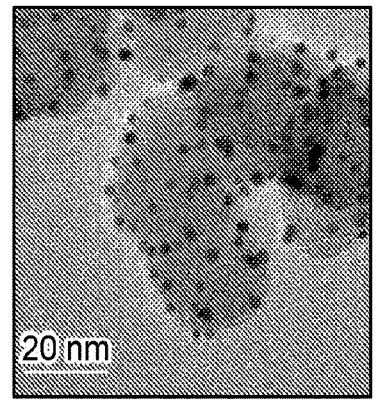
Figure 7:
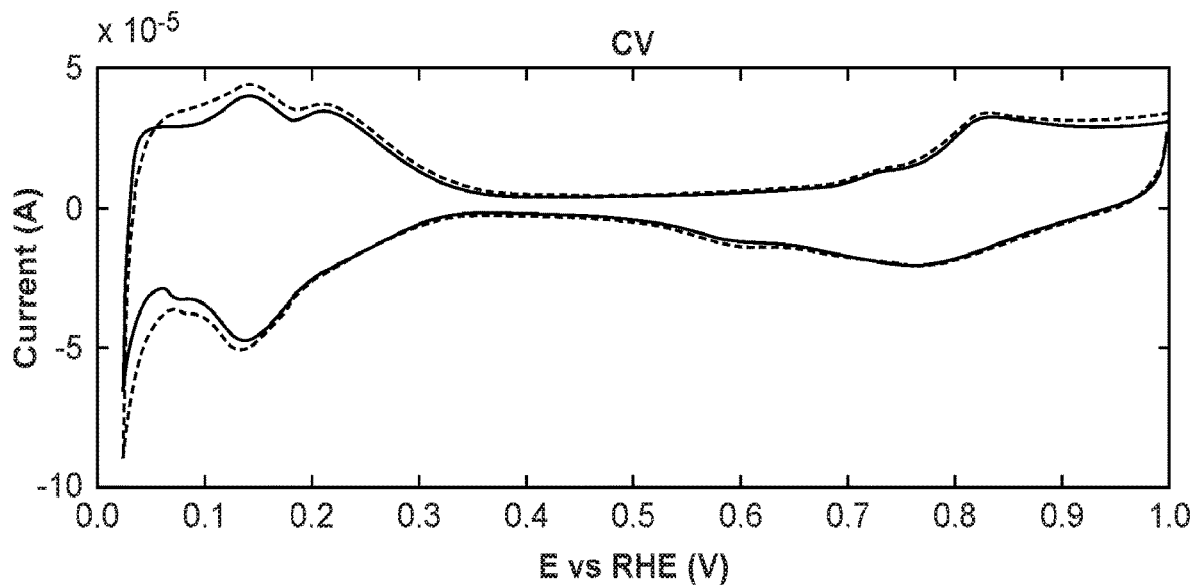
FIG. 7. Cyclic voltammetry curves (top) of 40 cycles of PALD Pt/C samples before and after 10,000 ADT in $O_2$, with projected kinetic current density (bottom left) and specific activity (bottom right) compared.
Figure 7:
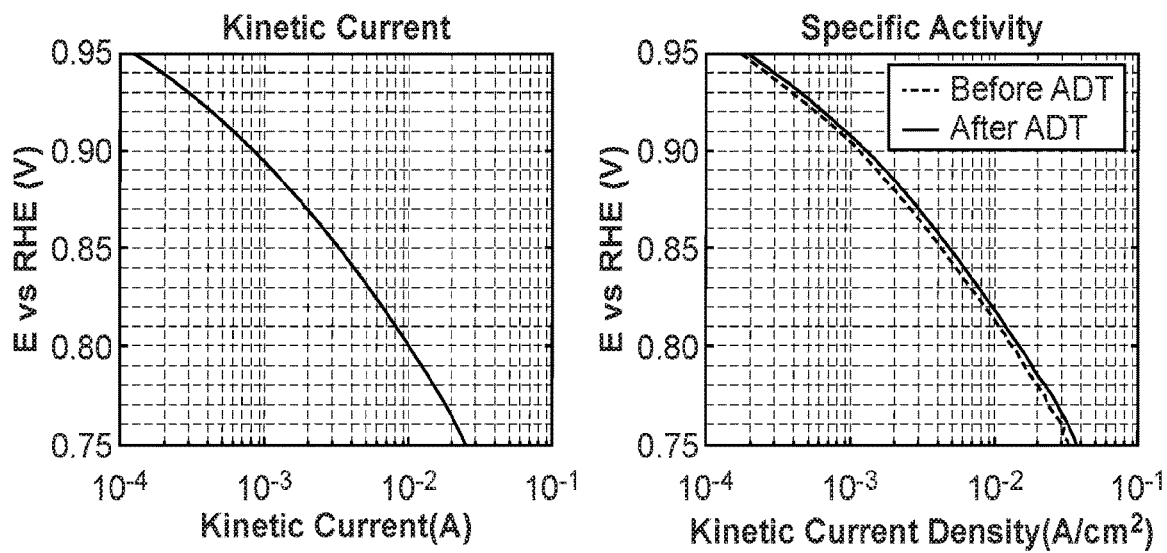
Figure 10:
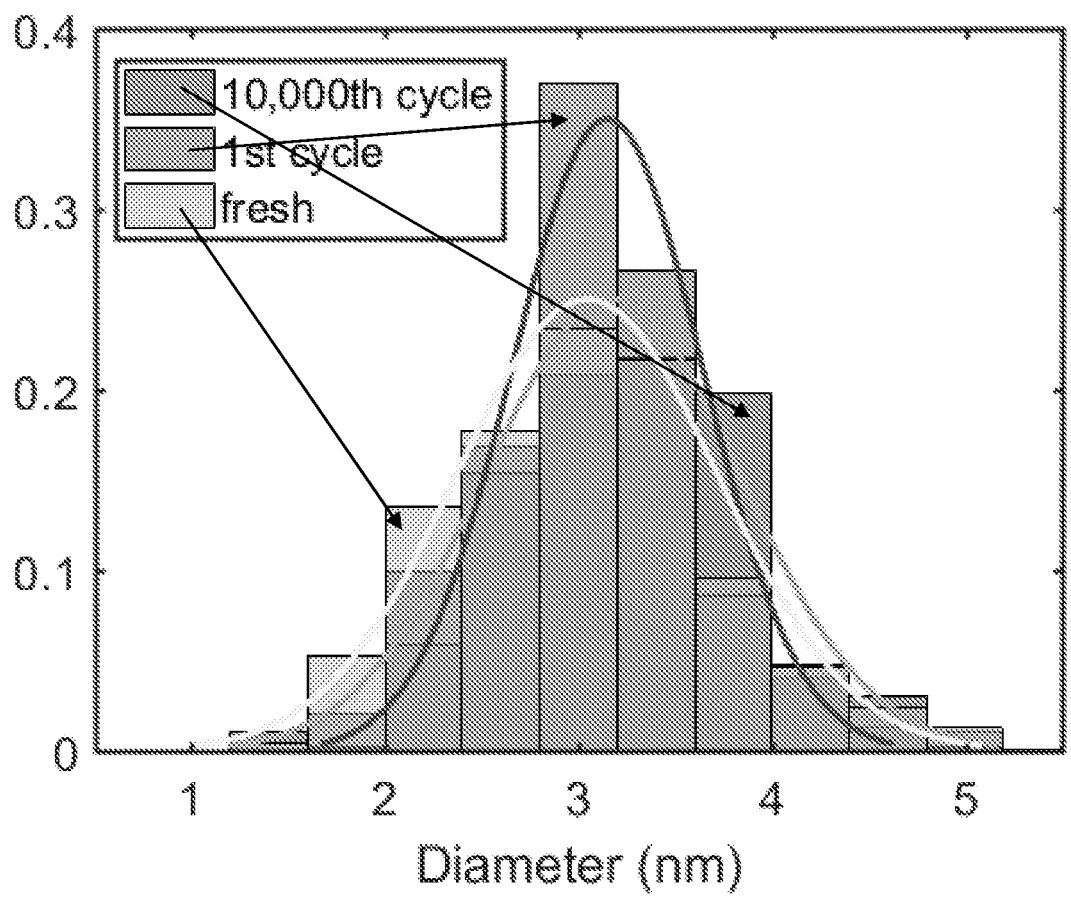
FIG. 10. Pt deposit size statistics of 40 cycles of PALD Pt/C catalysts before and after ORR tests.

Stability performance of the Pt/C catalyst is presented in FIG. 6b, where linear sweep voltammetry of the same catalyst before and after 10,000 cycles of accelerated degradation test (ADT) in oxygen saturated electrolyte is compared. Despite a small but noticeable change of electrochemical surface area (ECSA) (as shown by the cyclic voltammetry data in FIG. 7, roughly about −10% after ADT), the projected (geometric area normalized) kinetic current density is lowered by just about 1.2% (FIG. 7). This results in a set of almost overlapping oxygen reduction reaction (ORR) polarization curves and an improvement of about 10% on specific activity before and after ADT. The hydrogen under potential deposition (HUPD) ECSA takes account of all proton accessible Pt, while oxygen accessibility and electron accessibility on Pt dispersed with various configurations on a surface can vary. The results indicate the ADT process improved the utilization of Pt/C catalysts, likely by stripping Pt/C particles that are poorly attached to the catalyst thin film, which can have poor catalytic activities. Morphology of the Pt/C catalysts after 10,000 cycles is shown in FIG. 6c. Compared to the ones after a first ORR sweep, Pt deposits largely retained their average diameter (about 3.14 nm vs. about 3.18 nm after ADT), but with a slight ripening as the dispersion of size distribution increased from about 0.5 nm to about 0.7 nm (FIG. 10), indicating a ripening effect due to Pt oxidation and dissolution. Nevertheless, no significant agglomeration is found, possibly due to a strong Pt deposit/substrate adhesion.

In summary, this example has demonstrated the capability of a passivation gas in suppressing the thickness of Pt deposited during an atomic layer deposition process. This technique allows the direct deposition of thin Pt deposits onto carbonaceous catalyst supports. Such Pt/C catalysts have enhanced mass activity for oxygen reduction reactions as well as demonstrating a superior stability.

PALD and ALD

ALD of Pt was achieved by alternately exposing the Pt precursor, trimethyl(methylcyclopentadienyl) platinum (IV) (about 99%, Strem Chemicals), and the oxidant, ozone, to target substrates. Ozone was generated from a mixture of oxygen (about 99.99%) and nitrogen (about 99.998%, with mixing concentration of about 50 parts per million (ppm)) in an ozone generator (MKS Instrument, AX8407-C2). The feeding oxygen flow rate was kept at about 500 standard cubic centimeters per minute (sccm), providing an ozone concentration of about 21.7 wt. %. The Pt precursor was heated at about 80° C. To assure the metallic form of deposited Pt, hydrogen (about 99.999%, Praxair) was introduced in each cycle after the oxidation stage.

PALD was achieved by incorporating a passivation gas soaking operation at the end of each ALD cycle. In this example, carbon monoxide (about 99.5%, Praxair) was fed into an ALD chamber to soak the substrate at about 2 Torr for about 20 seconds at the end of each ALD cycle. Prior to Pt deposition, the carbon substrates underwent exposure to oxygen plasma in a plasma cleaner (Harrick PDC-001) for about 10 mins for surface functionalization.

Electrochemical Measurements

For ORR activity tests, Pt-coated glassy carbon electrodes were assembled in RDE tips. An electrolyte was diluted from about 70% perchloric acid (Merck, Suprapur) to about 0.1 mol/L with ultrapure water (about 18.2 MΩ·cm, total organic carbon (TOC)<about 5 parts per billion (ppb)). A three-electrode cell with a platinum wire as a counter electrode and a RHE as a reference electrode was used. During ORR measurements, the pressure of oxygen was balanced by atmospheric pressure. The measurement temperature was 23±2° C., and the voltammetry was conducted by a Gamry PCI4/300 potentiostat. To reduce contaminants, all glassware was soaked in piranha solution for more than about 24 hours, and rinsed 5 times with ultrapure water prior to use. Before measuring their ORR activity, all electrodes underwent an activation process in argon gas-purged electrolyte with cyclic voltammetry from about 0.025 V to about 1.0 V for 50 cycles at a scan rate of about 500 mV/s. ORR activity of the catalyst-loaded electrode was evaluated by a linear sweep voltammetry at a scan rate of about 20 mV/s from about −0.01 V to about 1 V under an electrode rotation speed of about 1600 rpm. Reported values are corrected for background and uncompensated electrolyte resistance.

For Pt/C catalysts, about 45 mg of powder (based on mass of carbon) was dispersed in about 25 ml of ultrapure water with assistance of sonication. About 3 ml of the suspension was further diluted with ultrapure water by 3 times, followed by addition of about 10 μl of about 5% Nafion solution and about 1.12 ml of anhydrous ethanol. This mixture was then sonicated in an ice bath for about 20 mins prior to dispersion onto glassy carbon electrodes. For a typical electrode, an aliquot of about 10-40 μl is dropped to the RDE tip (corresponding to Pt loading range from about 2 to about 20 μg/cm$^2$), which is rotated at about 700 rpm for about 1 hour for solvent evaporation and thin film formation. The electrode is then measured with the same protocol as described above.

The accelerated degradation test (ADT) is conducted by cycling the electrochemical potential from about 0.6 V to about 1.0 V (vs. RHE) with a scan rate of about 100 mV/s for 10,000 cycles. After ADT (about 23 hours), the tip is put into fresh electrolyte and undergoes the same activation and cyclic voltammetry process in the inert gas saturated environment before performing test of ORR activity in the oxygen environment.

Material Characterizations

Mass of Pt was quantified by inductively coupled plasma mass spectrometry (ICP-MS). For Pt/C samples, the electrode was immersed in aqua regia overnight, and the Pt concentration of the solution was measured.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," "approximately," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In the description of some embodiments, an object "on" another object can encompass cases where the former object is directly on (e.g., in physical contact with) the latter object, as well as cases where one or more intervening objects are located between the former object and the latter object.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A supported catalyst comprising:
a catalyst support, wherein the catalyst support is a carbonaceous support; and
deposits of a catalyst directly deposited on the catalyst support, covering the catalyst support and in contact with the catalyst support,
wherein the deposits have an average thickness of 2 nm or less, and the deposits are spaced apart from one another on the support,
wherein an average edge-to-edge distance exposing the support between nearest neighboring deposits is 0.2 nm to 10 nm;
wherein an average aspect ratio, in terms of a ratio of a lateral size to a thickness, of the deposits is greater than 2; and
wherein an average lateral size of the deposits is 20 nm or less.

2. The supported catalyst of claim 1, wherein the average thickness of the deposits is 1.8 nm or less.

3. The supported catalyst of claim 1, wherein the average thickness of the deposits is 1.6 nm or less.

4. The supported catalyst of claim 1, wherein an average edge-to-edge distance between nearest neighboring deposits is 0.5 to 5 nm.

5. The supported catalyst of claim 1, wherein an average edge-to-edge distance between nearest neighboring deposits is 0.5 nm to 3 nm.

6. The supported catalyst of claim 1, wherein an average lateral size of the deposits is 10 nm or less.

7. The supported catalyst of claim 1, wherein an average lateral size of the deposits is 5 nm or less.

8. The supported catalyst of claim 1, wherein a standard deviation of lateral sizes of the deposits, relative to an average lateral size, is 100% or less.

9. The supported catalyst of claim 1, wherein a standard deviation of lateral sizes of the deposits, relative to an average lateral size, is 90% or less.

10. The supported catalyst of claim 1, wherein a standard deviation of lateral sizes of the deposits, relative to an average lateral size, is 80% or less.

11. The supported catalyst of claim 1, wherein the catalyst support is a carbonaceous nanoparticle.

12. The supported catalyst of claim 1, wherein the catalyst comprises a platinum group metal.

13. A membrane electrode assembly for a fuel cell, comprising a polymeric ion-conductive membrane and an electrocatalyst layer adjacent to the polymeric ion-conductive membrane, wherein the electrocatalyst layer comprises the supported catalyst of claim 1.

14. A fuel cell comprising:
a cathode electrocatalyst layer;
an anode electrocatalyst layer; and
a polymeric ion-conductive membrane disposed between the cathode electrocatalyst layer and the anode electrocatalyst layer,
wherein at least one of the cathode electrocatalyst layer or the anode electrocatalyst layer comprises the supported catalyst of claim 1.

* * * * *